(12) United States Patent
Xu et al.

(10) Patent No.: US 6,518,579 B1
(45) Date of Patent: Feb. 11, 2003

(54) NON-DESTRUCTIVE IN-SITU METHOD AND APPARATUS FOR DETERMINING RADIONUCLIDE DEPTH IN MEDIA

(75) Inventors: X. George Xu, Clifton Park, NY (US); Edward P. Naessens, West Point, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 09/330,660

(22) Filed: Jun. 11, 1999

(51) Int. Cl.[7] ................................................. G01T 1/00
(52) U.S. Cl. ........................................................ 250/393
(58) Field of Search ....................... 250/370.01, 363.01, 250/363.1, 358.1, 393

(56) References Cited

U.S. PATENT DOCUMENTS

| | | | | |
|---|---|---|---|---|
| 4,680,470 A | * | 7/1987 | Heald ........................ | 250/358.1 |
| 5,412,206 A | * | 5/1995 | Seidel et al. ................. | 250/253 |

\* cited by examiner

Primary Examiner—Constantine Hannaher
Assistant Examiner—Shun Lee
(74) Attorney, Agent, or Firm—Notaro & Michalos P.C.

(57) ABSTRACT

A non-destructive method and apparatus which is based on in-situ gamma spectroscopy is used to determine the depth of radiological contamination in media such as concrete. An algorithm, Gamma Penetration Depth Unfolding Algorithm (GPDUA), uses point kernel techniques to predict the depth of contamination based on the results of uncollided peak information from the in-situ gamma spectroscopy. The invention is better, faster, safer, and/or cheaper than the current practice in decontamination and decommissioning of facilities that are slow, rough and unsafe. The invention uses a priori knowledge of the contaminant source distribution. The applicable radiological contaminants of interest are any isotopes that emit two or more gamma rays per disintegration or isotopes that emit a single gamma ray but have gamma-emitting progeny in secular equilibrium with its parent (e.g., $^{60}$Co, $^{235}$U, and $^{137}$Cs to name a few). The predicted depths from the GPDUA algorithm using Monte Carlo N-Particle Transport Code (MCNP) simulations and laboratory experiments using $^{60}$Co have consistently produced predicted depths within 20% of the actual or known depth.

8 Claims, 5 Drawing Sheets

NON-DESTRUCTIVE IN-SITU METHOD AND APPARATUS FOR DETERMINING RADIONUCLIDE DEPTH IN MEDIA

STATEMENT OF GOVERNMENT INTEREST

Research to develop a prototype of the invention was supported partially by a National Science Foundation grant NSF/ILI #DUE-9750725 and a Department of Energy Grant DE-FG07-98ER62706.

FIELD AND BACKGROUND OF THE INVENTION

The present invention relates in general to radiation detection techniques, and in particular to a new and useful non-destructive in-situ method and apparatus for determining the depth in a medium such as concrete, of radionuclides, between the radioactive source and a detector.

As a result of the Department of Energy's (DOE's) shift away from nuclear weapons production and the closing of nuclear power industry facilities, there has been a rapid increase in the number of sites and facilities which contain radioactive contaminants. A large part DOE and nuclear industry activity has been dedicated to the disposition of these facilities through various environmental restoration, and decontamination and decommissioning (D&D) projects. The resources spent on radiological characterization, monitoring and risk assessment contribute significantly to the anticipated total D&D budget of $265 billion dollars over the next 75 years.

Concrete is probably the most important medium or material for radiation shielding and operating structure in nuclear facilities. It has been estimated that there are approximately 73 km$^3$ of radioactively contaminated concrete material within 25 DOE facilities. Additionally, the DOE estimates that over 550,000 metric tons of radiological contaminated metal will require characterization and disposition. In many cases, the contaminants are found not only on the surface, but also at depths below the surface of a medium.

Current practice in characterizing deeply contaminated concrete in DOE and nuclear industry facilities employ destructive approaches. In most cases, a surface survey is performed first, and then bore samples are taken manually. The samples are then sent to an off-site lab to analyze the depth profile. It usually takes days to weeks to obtain a result, whose accuracy is only as good as the bore sampling process. For a large contamination area, the task of making representative measurements can be too time-consuming to be practical. Further, because airborne radioactivity is generated when core bore samples are taken manually, occupational exposure is inevitable. The potential for internal exposure to radioactivity requires the use of protective equipment, which in turn slows down the worker's progress. The current practice in characterizing concrete contamination is inefficient and costly. The radiation protection philosophy of as-low-as-reasonably-achievable (ALARA) can be better accomplished through non-destructive means.

Gamma spectroscopy has been widely used for isotope identification and quantification by measuring the energies of the gamma rays, which can easily penetrate thick samples. When calibrated against a reference radioactive source, the radioactivity of the sample can be determined remotely. Despite these capabilities, gamma spectroscopy has not been demonstrated to be satisfactory for determining a contamination depth profile in-situ. The major difficulty is that while gamma spectroscopy utilizes the photopeaks from the uncollided gamma rays to identify radioisotopes, there has been no sufficient unfolding algorithm to determine the depth to which the gamma rays have penetrated. There is also a lack of tools that can quickly estimate the contamination activity levels and assess the doses or risk caused by the contamination. This information is crucial in deciding cleanup action and demonstrating compliance with regulations on releasing a facility.

Some of the more common contaminants have been reported recently. Table 1 lists the radiological information for some of these contaminants that emit gamma rays. The gamma energy lines are said to be the "finger prints" of these radiological contaminants. For example, it is possible to measure uranium isotopes by detecting the gamma energies, such as the 143 keV (10% yield) and 185 keV (50% yield) for $^{235}$U. Highly efficient detectors are often used for isotopes with lower gamma energies and emission yields. The advantage of gamma ray spectroscopy is that gamma rays are much more penetrating than beta and alpha radiation, thus making non-destructive in-situ measurements possible. Table 1 provides the more important gamma lines and gamma yields for common isotopes that may be found in the DOE and nuclear industry. Additionally, $^{38}$Cl is listed in Table 1 because the chlorine in salt, NaCl, may be neutron activated and subsequently emit two prominent gamma rays at 1642 keV (32.8% yield) and 2167 keV (44.0% yield).

TABLE 1

| Radionuclide[b] | Gamma Energy (MeV) | % Yield |
|---|---|---|
| $^{60}$Co | 1.17323 | 99.86 |
| (NTH $^{59}$Co) | 1.33251 | 99.98 |
| (NFA $^{60}$Ni) | | |
| (NFA $^{63}$Cu) | | |
| $^{59}$Fe | 1.09922 | 56.50 |
| (NTH $^{58}$Fe) | 1.29156 | 43.20 |
| (NFA $^{52}$Ni) | | |
| (NFA $^{59}$Co) | | |
| $^{38}$Cl | 1.6424 | 32.80 |
| (NTH $^{37}$Cl) | 2.1675 | 44.00 |
| (NFA $^{41}$K) | | |
| (NFA $^{38}$Ar) | | |
| $^{137}$Cs | 0.66162 | 84.62 |
| (NTH $^{136}$Xe) | 0.03219 | 3.70 |
| (NFA $^{136}$Ba) | | |
| (NFI 6.210) | | |
| $^{234}$U | 0.01360 | 10.40 |
| (NTH $^{233}$U) | 0.05310 | 0.12 |
| (NFA $^{235}$U) | 0.12100 | 0.04 |
| (NAT $^{238}$U) | | |
| $^{235}$U | 0.14376 | 10.50 |
| (NAT $^{235}$U) | 0.16335 | 4.70 |
| | 0.18572 | 54.00 |
| | 0.20531 | 4.70 |
| $^{238}$U | 0.01300 | 8.70 |
| (NAT $^{238}$U) | 0.04800 | 0.08 |
| $^{235}$Pu | 0.04910 | 2.34 |
| (CHA $^{235}$U) | 0.09708 | 19.50 |
| (CHA $^{233}$U) | 0.10107 | 34.80 |
| | 0.11400 | 13.60 |
| | 0.11750 | 4.50 |
| $^{239}$Pu | 0.01360 | 4.40 |
| (NTH $^{238}$U) | 0.05162 | 0.04 |
| $^{240}$Pu | 0.01360 | 11.00 |
| (NTH $^{239}$Pu) | 0.04524 | 0.05 |
| $^{241}$Am | 0.01390 | 28.00 |
| (NTH $^{240}$Pu) | 0.02636 | 2.50 |
| | 0.05954 | 36.30 |
| $^{231}$Th | 0.01330 | 92.00 |
| (NAT $^{235}$U) | 0.02664 | 18.70 |
| | 0.08421 | 8.00 |
| | 0.08995 | 1.25 |
| $^{234}$Th | 0.01330 | 9.80 |

TABLE 1-continued

| Radionuclide[b] | Gamma Energy (MeV) | % Yield |
|---|---|---|
| (NAT $^{238}$U) | 0.06329 | 3.90 |
|  | 0.09238 | 2.57 |
|  | 0.09289 | 3.00 |
| $^{239}$Np | 0.01430 | 56.00 |
| (NTH $^{238}$U) | 0.09950 | 15.00 |
|  | 0.10370 | 24.00 |
|  | 0.10613 | 22.70 |
|  | 0.11770 | 8.40 |
|  | 0.12070 | 3.20 |
|  | 0.22819 | 10.70 |
|  | 0.27760 | 14.10 |
| $^{235}$Np | 0.09466 | 22.00 |
| (CHA $^{235}$U) | 0.09844 | 38.00 |
| (CHA $^{233}$U) | 0.11100 | 15.00 |
|  | 0.11450 | 5.30 |
| $^{237}$Np | 0.02938 | 9.80 |
| (NFA $^{238}$U) | 0.08649 | 13.10 |
|  | 0.09229 | 1.82 |
|  | 0.09507 | 2.96 |
|  | 0.10800 | 1.02 |

Items in parenthesis indicate the nuclear reactions producing the radioisotopes based on the bombarding particle and the target nuclei as follows: NTH by thermal neutron isotopes; NFA by fast neutron; CHA by charged particles (alpha, proton, deuterons, etc.); NAT by natural occurring isotopes; NFI by fission with cumulative fission yield in percent for thermal neutron fission of $^{235}$U.

The technique of the present invention, as will be explained later in this disclosure, can then be used to determine the depth of salt embedded in pavement or concrete shielding pads. Salt contamination of rebars leads to cracks, potholes, etc. in concrete and pavement.

Many researchers have developed models that use in-situ gamma spectroscopy to estimate the depth of contamination in media. Most of the research has been in the detection of $^{137}$Cs contaminant distributions in soil as a result of post-Chernobyl environmental characterizations.

Russ et al. (1996) developed a method using in-situ gamma spectroscopy on transite panels at the DOE Fernald site that required measurements using an uncollimated high purity germanium (HPGe) detector on both sides of the medium. Although the method showed potential for predicting the contaminant depth distribution throughout the thin transite panel, the method requires access to both sides of a medium. Insufficient information was also provide to determine the technique used for any unfolding algorithm that was used. In conjunction with knowledge of the gamma-ray linear attenuation coefficient for the material, the method used the ratio of the photopeak areas at several energies to infer the "most-probable" contamination distribution. Because the method used uncollimated HPGe detectors the in-situ gamma spectroscopy results were of the entire transite panels and local depth profiles across the surface area could not be obtained.

Korun et al. (1991) developed a method to determine depth distribution of $^{137}$Cs concentrations in soils based on the energy dependence of attenuation of gamma rays in soil. The method assumed a decreasing exponential distribution in the radionuclide concentration. The decreasing exponential contains a special parameter referred to as the relaxation length. Laboratory and experimental results must be conducted to determine the parameter value. A limitation of the method is that it cannot be applied independently for radionuclides that emit gamma rays at a single energy without prior knowledge about the relaxation length parameter. The method also requires specific knowledge of the linear attenuation coefficients of the materials and the detector's absolute efficiency. The knowledge of the absolute efficiency is complicated in that the angular dependence of the detector's efficiency as a function of energy must be known. Korun et al. (1991) recognized that for inhomogeneously distributed radionuclei, the relaxation lengths overestimate the actual depth distribution due to oversimplification in the model.

Fulop and Ragan (1997) improved on Korun's method for predicting depth using in-situ gamma spectroscopy specifically for $^{137}$Cs concentrations in soil. This method makes use of gamma spectroscopy information from the scattered and unscattered gamma rays between the energy range of 0.620 MeV to 0.655 MeV. A limitation of the method is that it requires multiple measurements with and without collimators and it is designed specifically for $^{137}$Cs only.

Rybacek et al. (1992) developed a method for depth determination by in-situ gamma spectroscopy. The method used the ratio of fluence rates of unscattered gamma rays of $^{137}$Cs whose decay product of $^{137m}$Ba emits gamma-rays with energies of 0.662 MeV and 0.032 MeV. A limitation of the method is that it requires multiple prominent gamma peaks with large energy differences and was developed primarily for $^{137}$Cs.

The methods described above have demonstrated success for using in-situ gamma spectroscopy to determine depth distributions for the specific purposes as designed. Most of the methods have been restricted to the characterization of $^{137}$Cs in soil and consequently have limited applicability to DOE and nuclear industry facilities. An appropriate method for DOE and the nuclear industry using in-situ gamma spectroscopy would be one that improves on the limitations of all the methods described above and can be used for many radioactive isotopes such as those listed in Table 1.

SUMMARY OF THE INVENTION

An object of the present invention is to provide a method and an apparatus for the non-destructive, in-situ determination of the depth of a radiological contamination in media using gamma spectroscopy and a gamma penetration depth unfolding algorithm (GPDUA) with point kernel techniques to predict the depth of contamination based on the results of uncollided peak information from the in-situ gamma spectroscopy. The invention provides a better, faster, safer and cheaper technique than the current practice for decontamination and decommissioning of facilities that pose a radiation danger. The invention uses a priori knowledge of the contaminant source distribution. The applicable radiological contaminants of interest are any isotopes that emit two or more gamma rays per disintegration or isotopes that emit a single gamma ray but have gamma-emitting progeny in secular equilibrium with its parent (e.g., $^{60}$Co, $^{235}$U, and $^{137}$Cs to name a few)

The predicted depths from the GPDUA algorithm using Monte Carlo N-Particle Transport Code (MCNP) simulations and laboratory experiments using $^{60}$Co have consistently produced predicted depths within 20% of the actual or known depth.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
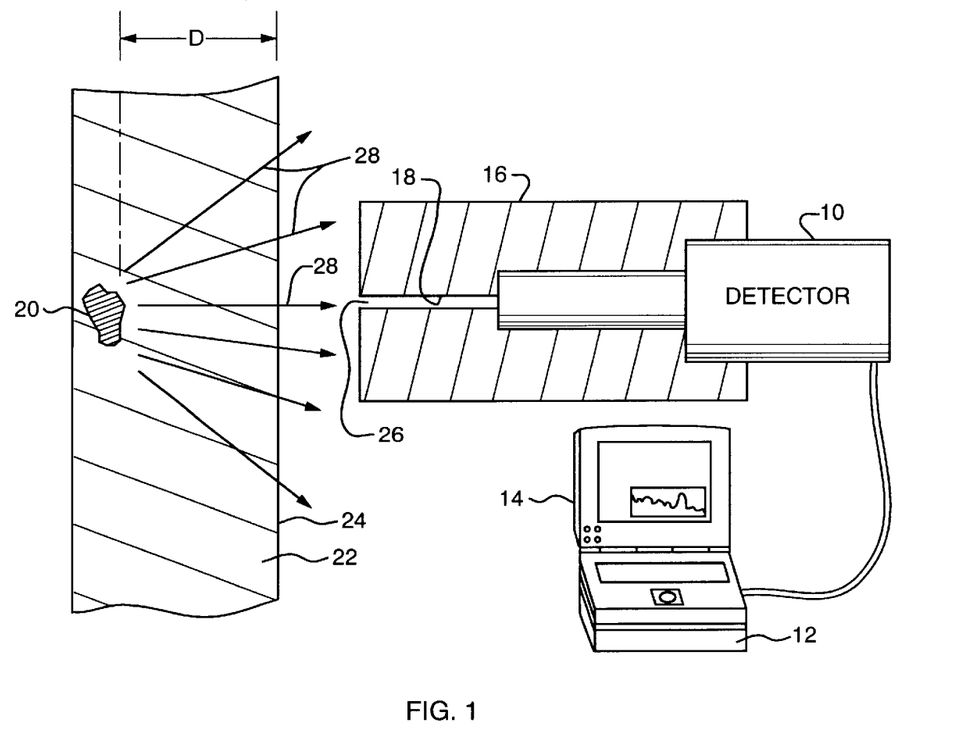
FIG. 1 is a schematic view of an apparatus of the invention.

An in-situ, gamma spectroscopy apparatus of the present invention is schematically illustrated in FIG. 1. The apparatus comprises a portable HPGe detector 10 which is connected to a unit 12 that includes a multi-channel analyzer (MCA), a high voltage source and an amplifier unit. Such a unit is available commercially. An example is the InSpector product from Canberra Industries of Meriden Connecticut.

The apparatus includes a laptop computer 14 with counting and other software needed to practice the invention, and a single lead collimator 16 with a collimating aperture 18 for receiving gamma radiation from a radiological contamination or radionuclide 20 at an unknown depth D in a medium, such as a concrete wall 22. The in-situ apparatus and method of the invention measures the surface activity from only one side of the medium or wall 22 as shown in FIG. 1 and can be run on rechargeable batteries for six hours, making it extremely useful for field work.

The method of the invention places no restrictions on the gamma spectrometry peak separation or relative peak height. The only requirement is that the peaks must be resolvable with a gamma spectrometer such as an HPGe or NaI detector. The resolution of the detector 10 used in research that confirmed the utility of the present invention had a Full Width at Half Maximum (FWHM) value of 2.0±0.03 keV at 1333 keV.

The lead collimator 16 serves two primary purposes. First, the lead collimator ensures that any assay of the radiologically contaminated medium is focused on a small area so that the entire surface of the medium can be mapped out with a depth profile.

Depth of radiological contaminants may vary in the medium and consequently this can only be discovered if the in-situ gamma spectroscopy is focused by the collimators. The ultimate goal of the invention is to provide a contour mapping of the depth distribution along the entire surface 24 of the medium. Second, the lead collimator simplifies efficiency calculations of the detector since it is necessary to use only a point particle contaminant source in order to determine the efficiency of the system.

The efficiency determination in essence becomes geometrically independent. To ensure that the response time for collecting gamma rays is as quick as possible, the solid angle created by the collimator opening 26 must be large enough while ensuring the first purpose of the collimator, as stated above, is not violated.

The method is applicable only to isotopes that emit two or more gamma rays 28 or if a single gamma-emitting isotope has gamma-emitting progeny in secular equilibrium. The uncollided peaks of the gamma spectroscopy contain the only information necessary for the Gamma Penetration Depth Unfolding Algorithm (GPDUA) of the invention. It is the ratio of the counts in the uncollided peaks that contains the necessary information to determine the depth D of the contamination 20. This process will be discussed in the general theory using the narrow-beam approximation.

The General Theory Using the Narrow-Beam Approximation

Gamma ray transport under conditions of "good geometry" and a narrow-beam approximation will undergo attenuation based on the energy of the gamma rays and the material that the gamma rays transport through. The gamma ray attenuation relation for the "good geometry" narrow-beam approximation is $$N = N_0 e^{-\mu x} \tag{1}$$

where $N_0$ and $N$ are the number of gamma rays at the incident gamma ray energy in a narrow beam before and after the attenuation, respectively, and $\mu$ is the linear attenuation coefficient characteristic of the medium and energy of the gamma ray. The variable x, is the length of the medium that gamma rays propagate through without interaction. The gamma ray counts $N_0$, refer to those gamma rays impacting on the detector surface. A fraction of these gamma rays will be recorded based on the counting efficiencies of the detector. Consequently, the uncollided peak counts from the collected spectrum must be corrected for the Compton continuum and for intrinsic efficiency of the detector in order to determine the counts impacting on the surface of the detector.

Figure 2:
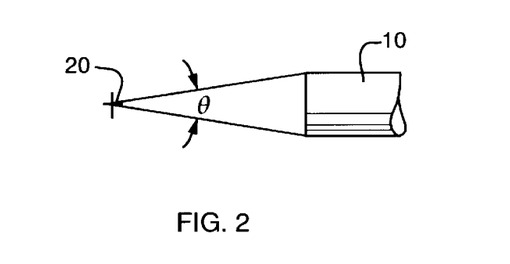
FIG. 2 is a schematic illustration of the radiation source-to-detector solid angle geometry of the invention.

To ensure that narrow-beam approximations are valid for a system, not only is it necessary that the incident beam on the detector contains only uncollided gamma rays, but also gamma rays impacting the detector are normal to (or nearly normal to) the detector surface where the small angle approximation applies, $\tan \theta \approx \theta$, as shown in FIG. 2.

When these conditions are met, the beam can be treated as a narrow-beam approximation. This becomes the basis for determining the collimator dimensions, detector locations, etc. in measuring gamma rays in-situ.

If the conditions of "good geometry" and narrow-beam are applicable then equation (1) is easily applied to produce an elegant and simple model to predict the depth of contamination for a point particle. From a source activity $A_0$, the two gamma rays emitted will obey the narrow beam attenuation equations:

$$\frac{N_1}{\varepsilon_1} = A_o \frac{\Omega}{4\pi} t_1 Y_1 e^{-\mu_1 x} \quad (2)$$

$$\frac{N_2}{\varepsilon_2} = A_o \frac{\Omega}{4\pi} t_2 Y_2 e^{-\mu_2 x} \quad (3)$$

where;

$Y_1$, $Y_2$ = the gamma yields;

$\varepsilon_1$, $\varepsilon_2$ = the intrinsic peak efficiencies of the detector for the respective gamma ray energies;

$\mu_1$, $\mu_2$ = the attenuation coefficients of the gamma ray energies in the contaminated material;

$N_1$, $N_2$ = are the uncollided peak counts from the gamma spectroscopy after the superimposed Compton scattering is subtracted;

$A_0$ = is the activity of the point source;

$t_1$, $t_2$ = are the counting times which will typically be equal; and $\Omega$ = the solid angle subtending from the point source across the detector surface.

Taking the ratio of equations (2) and (3), the narrow-beam approximation expression to determine the depth, x, of the contamination is, $$x = \frac{\ln\left(\frac{N_1 t_2 Y_2 \varepsilon_2}{N_2 t_1 Y_1 \varepsilon_1}\right)}{\mu_2 - \mu_1}. \quad (4)$$

The unknown contaminant activity $A_0$, and the solid angle are canceled out in the ratio. Everything remaining in this expression is known data. The yield and linear attenuation coefficient for each gamma rays are published data. The intrinsic efficiencies can be predetermined for the detector. The ratio is the measured ratio of uncollided counts in the photopeaks from the gamma spectroscopy after the Compton continuum is subtracted.

This simple model is the basis of the theory of the invention. By taking the ratio of the uncollided peak counts in the gamma spectroscopy for both gamma rays emitted from the same source, any unknown information cancels in the ratio. This model is based on ideal and simple geometries.

Monte Carlo N-Particle Transport Code Version 4B (MCNP) (Breimeister 1997) simulations and laboratory experiments reveal that the narrow-beam approximation model defined in equation (4) produces discrepancies as high as 50% to 100% for the depth prediction. The primary reason for this high discrepancy is that the model is based on ideal and simple geometry which does not account for such effects as gamma ray transport through portions of the lead collimator. This realistic geometry effect will be referred to as the "lead effect." The "lead effect" is described in more detail later in this disclosure.

Verification and Validation Process

The narrow-beam approximation model is the start point for a more rigorous treatment using point kernel techniques that account for the "lead effect" and can be applied to realistic and more complicated geometries.

Figure 3:
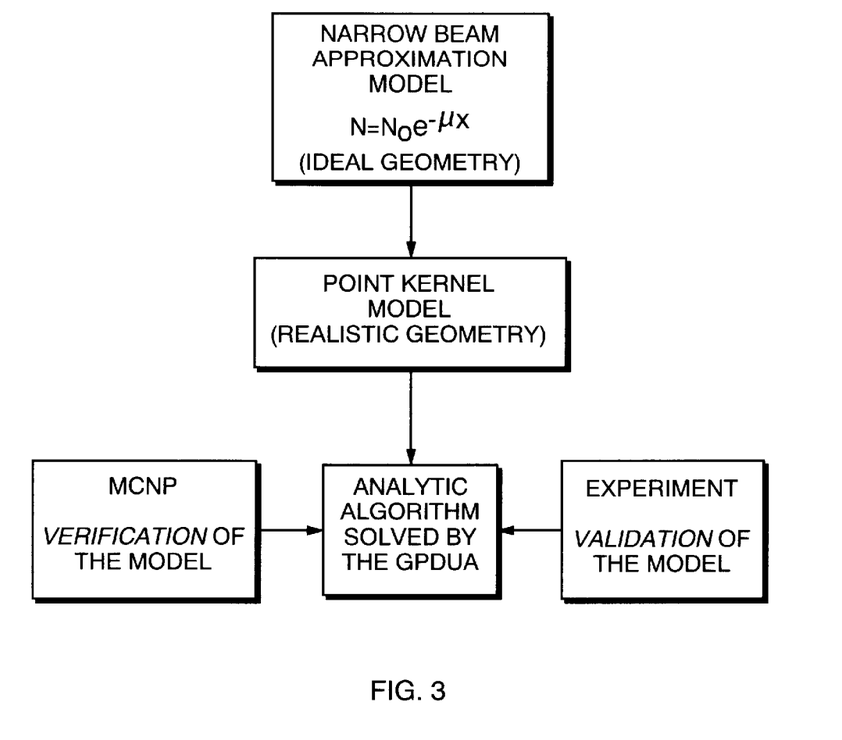
FIG. 3 is a low chart of an analytic model derivation with verification and validation process of the invention.

The analytic model verification and validation process is as shown in the flow chart of FIG. 3.

MCNP simulations were used to develop and verify the model. Validation of the model for point sources was also done through a laboratory experiment.

As shown later in this paper the uncollided peak counts contain the only information necessary for the depth prediction model. The uncollided peaks are those gamma rays that transport from the source to the detector without absorption or collisions. This allows source biasing in MCNP as the primary means for variance reduction. The direction of a gamma photon at birth is determined by the azimuthal angle (0 to 2 $\pi$) and a polar angle (0 to $\pi$). In reality, photons are emitted isotropically over a $4\pi$ solid angle. Directional biasing in MCNP permits focusing on a smaller range of azimuthal and polar angles. When using the biasing technique, particles are forced to be emitted from the source in a direction toward the detector, where all gammas are contained in a solid angle that encloses the entire detector volume. This method greatly improves the computational efficiency. The geometry for the MCNP simulations is similar to that for the laboratory experiment. The geometry is described in more detail in the following.

Depth Prediction Model Using Point Kernel Methods

Figure 5:
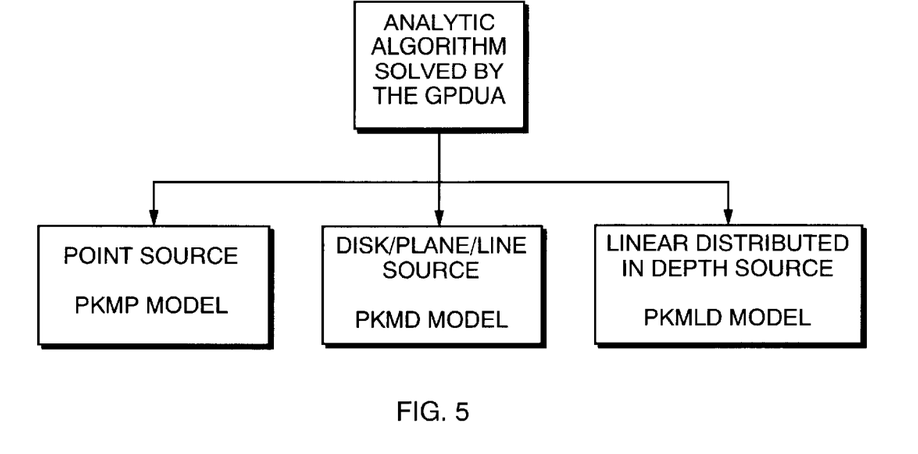
FIG. 5 is a flowchart showing source type for a corresponding analytic algorithm to be solved by the GPDUA.

The narrow-beam approximation model could be improved by including a correction factor(s) to account for the transport of gamma rays through portions of the lead collimator. The intent of the invention and this experiment to show the utility of the invention, was not to take the approach of determining correction factors(s), but to develop an analytic model that rigorously includes the transport of gamma rays through the lead collimator. This was accomplished using point kernel techniques combined with the fundamental approach described for the narrow-beam approximation model. Adapting the narrow-beam approximation model to rigorously include the effects of lead, leads to three additional analytic models as seen in FIG. 5. Prior knowledge of the source distribution is required before the correct analytic model is used in the GPDUA according to the invention.

Figure 6:
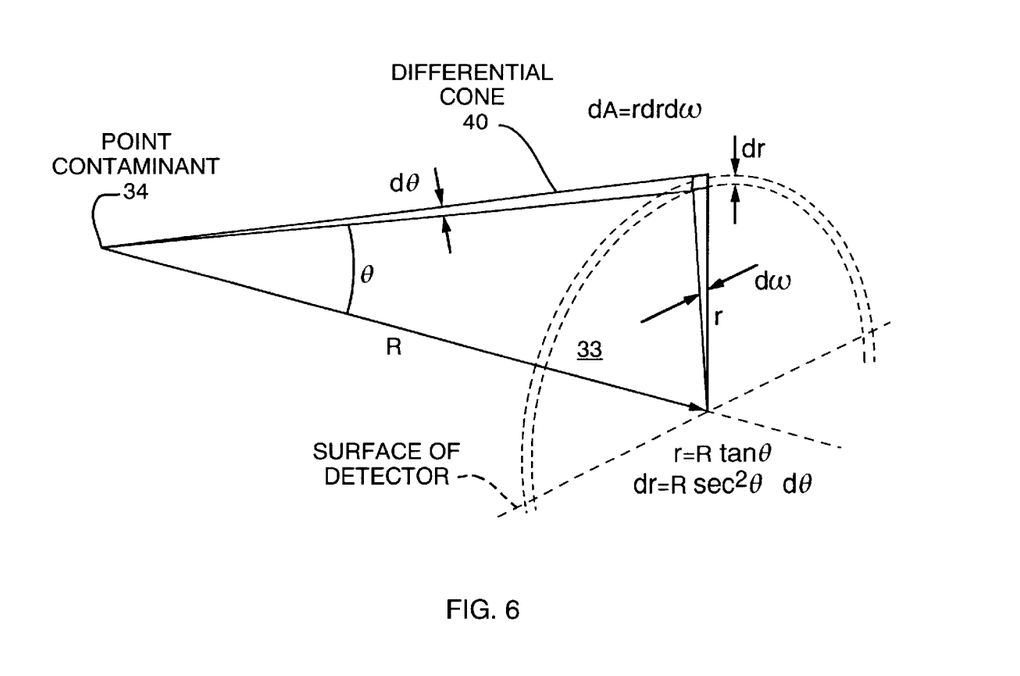
FIG. 6 is a schematic view of a point source-to-detector geometry.

The underlying concept for the point kernel method is that gamma rays emitted from a point source 34 will undergo material and geometric attenuation as they are emitted in a solid angle e in FIG. 6. If this solid angle is reduced to a small differential cone 40, then the fluence of gamma rays emitted through the base of the differential cone approach that of a narrow-beam approximation. The gamma rays emitted from the base of this differential cone can be integrated over the surface 33 of the detector 31 in FIG. 4. Detector 31 is surrounded by a lead collimator 30 with an aperture 38 opening through an end face 36 of the collimator. This will determine the total number of gamma rays impacting on the surface of the detector. Knowledge of the detector's intrinsic efficiency will allow comparison of the gamma spectroscopic results to the calculated surface counts by the point kernel method. Analogous to the discussion for the narrow-beam approximation model, the ratio of the surface counts at each gamma ray energy using the point kernel method will lead to the predicted depth of the contamination according to the method of the invention.

Figure 4:
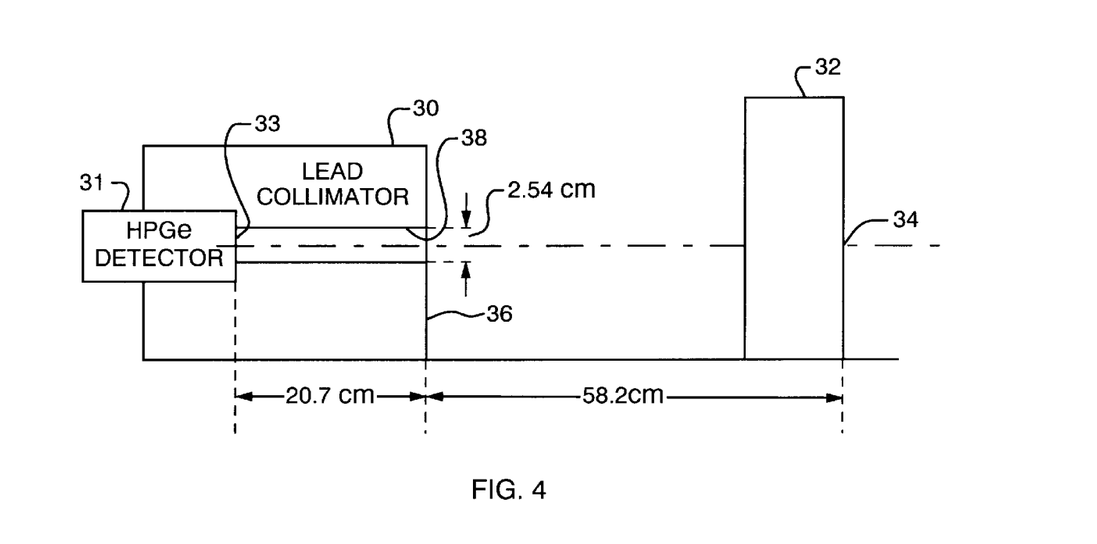
FIG. 4 is a schematic view of an experimental setup to validate the utility of the invention.

The material attenuation within the differential cone 40 approaches the conditions of ideal geometry and the narrow-beam approximation. As shown in FIG. 6, the point kernel method is applied within the differential cone 40 from the isotropic point source 34 to the detector differential surface area dA. The number of counts impacting on the surface 33 of the detector is determined by integrating the differential cone around the entire detector's surface. In general, the net counts on the surface of the detector can be expressed as $$N(E) = \frac{N'(E)}{\varepsilon(E)} = \int_{\text{Detector Surface}} A_o t Y(E) G(E, R(x), \theta) dA(R(x), \theta, \omega) \quad (5)$$

where: N(E) is the net counts impacting the surface of the detector at gamma energy, E; N' (E) is the net counts under the gamma spectroscopy peak at gamma energy, E, after the Compton continuum is subtracted; $\varepsilon(E)$ is the intrinsic efficiency of the detector at gamma energy (E); $A_0$ is the activity of the source; t is the counting time; Y(E) is the gamma yield at gamma energy E; $\theta$ is the polar angle measured from the central axis to the differential cone; $\omega$ is the azimuthal angle from 0 to $2\pi$; R(x) is the distance from the point source 34 to the detector surface 33 along the central axis; x is the depth of the contaminant point source along the central axis (that is the thickness of medium 32 in FIG. 4); dA[R (x),q, $\omega$] is the differential area described by the differential cone along the detector surface; and G[E,R (x),$\theta$] is the point kernel in the differential cone describing the detector response from the point source which is dependent on the gamma energy.

Within the differential cone, the gamma rays emitted from the point source undergo geometric and material attenuation before reaching the detector. The point kernel can be described in general as;

$$G(E, R(x), \theta) = \frac{\exp[-\mu(E)R(x)\sec\theta]}{4\pi[R(x)\sec\theta]^2} \quad (6)$$

where the numerator represents the material attenuation and the denominator represents the geometric attenuation through the differential cone. The point kernel continuously changes as the differential cone is integrated across the detector surface.

A detailed development of the final form of the analytic model is disclosed later under a section entitled Derivation of the Point Kernel Model for Point Particle (PKMP). The GPDUA, written in FORTRAN code and stored as a computer program in the computer 14 of FIG. 1, iterates on the depth variable x, until the ratio of the integral on the right hand side of equation (5) for each gamma ray energy is within a specified tolerance of the ratio of the surface counts on the left hand side of equation (5). The ratio of surface counts is obtained from the simulation results of the MCNP uncollided peak counts or the gamma spectroscopy uncollided peaks after adjusting these counts for the Compton continuum and the intrinsic efficiency.

Depth Prediction Model/Disk and Linear Sources

Figure 7:
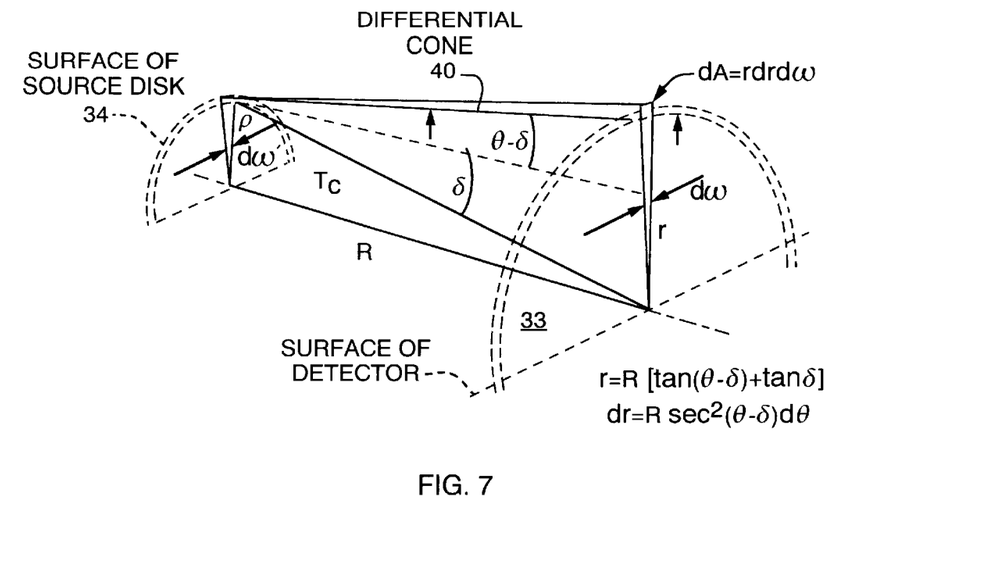
FIG. 7 is a schematic view of a disk source-to-detector geometry.

The development of the point kernel model for a disk, planar, or line source (PKMD model) is very similar to that described for the point source in the PKMP model; however, there is one significant innovation that makes the method successful. In order to integrate the differential cone symmetrically around the detector surface, it is necessary to redefine the polar axis as the bisector of the angle from the point on the source disk also designated 34, across the detector surface 33. For every source point on the source disk, the polar axis is defined from that source point as indicated by $T_c$ in FIG. 7. FIG. 7 demonstrates that the number of counts impacting on the surface of the detector is determined by integrating differential cones emanating from a differential source element (assumed to be an isotropic point source) to the differential area element along the detector surface. Integration in the model now occurs over the source as well as the detector surface. The general form of the PKMD model can be written $$N(E) = \quad (7)$$

$$\frac{N'(E)}{\varepsilon(E)} = A_o Y(E) t \int_{\text{Source}} \rho d\rho d\omega' \int_{\text{Detector}} G(E, R(x), \theta) dA(R(x), \theta, \omega)$$

In a process analogous to solving the PKMP, the GPDUA FORTRAN code performs double integration over the polar angle and the source disk radius. The code iterates on the depth of the contaminated disk until the ratio of the integrals on the right side of equation (7) for each gamma energy, converges to the ratio of the MCNP calculated (or MCA measured) uncollided surface counts on the detector.

The development of the model for a linear distributed source of activity (PKMLD) is analogous to that of the disk source. The distribution in depth is modeled as successive uniform disks in depth where each disk source activity decreases linearly with depth. The variation of activity in depth can be described in general as $$S(x)dx = A(x)dx \quad (8)$$

where A(x) is the uniform activity in the volume of the disk between depths x and x+dx. For a linear distribution of activity in depth, equation (8) is written, $$S(x)dx = A_0\left(\frac{T-x}{T}\right)dx \quad (9)$$

where $A_0$ is the surface activity if the depth was zero; T is the maximum depth of the contamination and x is the depth of the disk from the surface.

The general form of the PKMLD model can be written, $$N(E) = \frac{N'(E)}{\varepsilon(E)} = A_o Y(E) t \int_{\text{Depth}}\left(\frac{T-x}{T}\right)dx \int_{\text{Source}} \rho d\rho d\omega' \int_{\text{Detector}} G(E, R(x), \theta) dA(R(x), \theta, \omega) \quad (10)$$

The GPDUA FORTRAN code performs a triple integration over the polar angle, the disk radius, and the depth of the disks. The code iterates on the maximum depth, T, until the ratio of the integrals on the right hand side of equation (10) for each gamma energy converges to the ratio of the MCNP calculated (or MCA measured) uncollided surface counts on the detector.

MCNP and Experiment Results for Point Source Contaminant

All PKMP simulations and laboratory experiments were based on a 100 $\mu$Ci $^{60}$Co point contaminant. The counting time for laboratory experiment were anywhere from two to five minutes. Table 2 compares the depth prediction results based on MCNP simulations using the PKMP model. As evidenced in Table 2, the PKMP model provides a very good prediction of the point source contaminant depth to within 3% discrepancy of the actual depth. The depth predictions seem to improve with increasing depth primarily because the "lead effect" becomes more and more negligible. As the depth becomes greater, the solid angle between the point source and the detector surface becomes smaller to the point where the majority of gamma rays impacting on the lead collimator are 100% attenuated. This will be analyzed in more detail later when the "lead effect" is discussed.

Table 2 is shows the prediction results for a point contaminant in aluminum. The ratio of surface counts is determined from MCNP simulation. The value in the parenthesis is the percent discrepancy between the predicted and actual depths. Collimator radius is 1.27 cm, length is 20.32 cm, and distance from contaminated surface is 50.0 cm.

TABLE 2

| Actual Depth (cm) | Ratio of Surface Counts on Simulated MCNP Detector | Predicted Depth PKMP Model (cm) |
| --- | --- | --- |
| 1.00 | 1.0157 | 0.97 ± 0.02 (2.95%) |
| 2.00 | 1.0255 | 1.97 ± 0.05 (1.50%) |
| 5.00 | 1.0551 | 4.92 ± 0.11 (1.54%) |
| 8.00 | 1.0862 | 7.95 ± 0.18 (0.62%) |
| 10.00 | 1.1082 | 10.02 ± 0.23 (0.20%) |
| 15.00 | 1.1610 | 14.86 ± 0.34 (0.93%) |

Table 3 contains the results of changing the MCNP geometry to where the collimator radius is changed to 0.50 cm and the distance from the wall is changed to 10.0 cm. Again, the PKMP model provides outstanding predictions to within 2% discrepancy of the actual depth. The MCNP simulations verify that the PKMP prediction models provide very good predictions for the depth of point contaminants. The PKMP model is validated through laboratory experiments as previously described with the results as shown in Table 4. The PKMP model predicted depths are consistently within 5% discrepancy of the known depth.

Table 3 predicts results for a point contaminant in aluminum. The ratio of surface counts is determined from MCNP simulation. The value in the parenthesis is the percent discrepancy between the predicted and actual depths. Collimator radius is 0.50 cm, length is 20.32 cm, and distance from contaminated surface is 10.0 cm.

TABLE 3

| Actual Depth (cm) | Ratio of Surface Counts on Simulated MCNP Detector | Predicted Depth PKMP Model (cm) |
| --- | --- | --- |
| 1.00 | 1.0230 | 0.99 ± 0.02 (1.05%) |
| 2.00 | 1.0324 | 1.99 ± 0.04 (0.65%) |
| 5.00 | 1.0615 | 4.97 ± 0.1 (0.50%) |
| 8.00 | 1.0913 | 7.94 ± 0.18 (0.80%) |
| 10.00 | 1.1119 | 9.92 ± 0.22 (0.80%) |
| 15.00 | 1.1662 | 15.0 ± 0.34 (0.27%) |

Table 4 shows experiment results for a point contaminant source. The value in parenthesis is the percent discrepancy between the predicted and actual depths.

TABLE 4

| Actual Depth ± 0.07 (cm) | Material | Ratio of Surface Counts from Experiment | Predicted Depth PKMP Model (cm) (lead corrected) |
| --- | --- | --- | --- |
| 1.18 | Aluminum | 1.0168 | 1.12 ± 0.08 (4.72%) |
| 2.50 | Aluminum | 1.0308 | 2.54 ± 0.17 (1.41%) |
| 3.80 | Aluminum | 1.0431 | 3.76 ± 0.26 (1.04%) |
| 5.10 | Aluminum | 1.0568 | 5.12 ± 0.35 (0.33%) |
| 6.40 | Aluminum | 1.0702 | 6.41 ± 0.44 (0.23%) |
| 2.50 | Polyethylene | 1.1054 | 2.44 ± 0.18 (2.38%) |
| 2.60 | Polyethylene | 1.1062 | 2.64 ± 0.20 (1.75%) |
| 5.10 | Polyethylene | 1.0264 | 5.19 ± 0.38 (1.78%) |
| 7.65 | Polyethylene | 1.0361 | 7.60 ± 0.57 (0.70%) |

MCNP Results for the Disk and Linearly Source

For all MCNP simulations the geometry was set as follows; the radius of the contaminated disk sources was 4.00 cm, the collimator radius was 1.27 cm, the collimator length was 20.32 cm, and the surface of the contaminated medium was 50.00 cm from the collimator. In order to simulate the linear distribution of activity in the MCNP simulations, source disks of $^{60}$Co were constructed at discrete positions along the axis of the distribution. Each disk had the same radius and extent from its position along the axis; however, the source probability for each position linearly decreased. As a standard, the maximum depth was divided by 200 to determine the number of source disks. Table 5 contains the prediction results for the PKMD and PKMLD models using the ratio of counts from the MCNP simulations. As demonstrated in Table 5, the GPDUA provides predicted depths consistently to within 10% discrepancy of the actual depth.

Table 5 predictes depths using the PKMD and PKMLD models. The ratio of surface counts was obtained from MCNP simulations where the contaminant source distribution is in aluminum. The value in parenthesis is the percent discrepancy between the predicted depth and the actual depth.

TABLE 5

| Actual Depth (cm) | Predicted Depth PKMD Model (cm) | Predicted Depth PKMLD Model (cm) |
| --- | --- | --- |
| 1.00 | 0.98 ± 0.02 (1.80%) | 1.06 ± 0.02 (6.00%) |
| 2.00 | 1.99 ± 0.05 (0.69%) | 1.96 ± 0.04 (1.87%) |
| 5.00 | 5.10 ± 0.12 (2.00%) | 4.94 ± 0.10 (1.20%) |
| 8.00 | 8.02 ± 0.18 (0.23%) | 7.98 ± 0.17 (0.25%) |
| 10.00 | 9.85 ± 0.23 (1.50%) | 9.83 ± 0.20 (1.70%) |
| 15.00 | 14.7 ± 0.34 (2.00%) | 14.5 ± 0.30 (3.05%) |

The GPDUA Input Requirements

Figure 8:
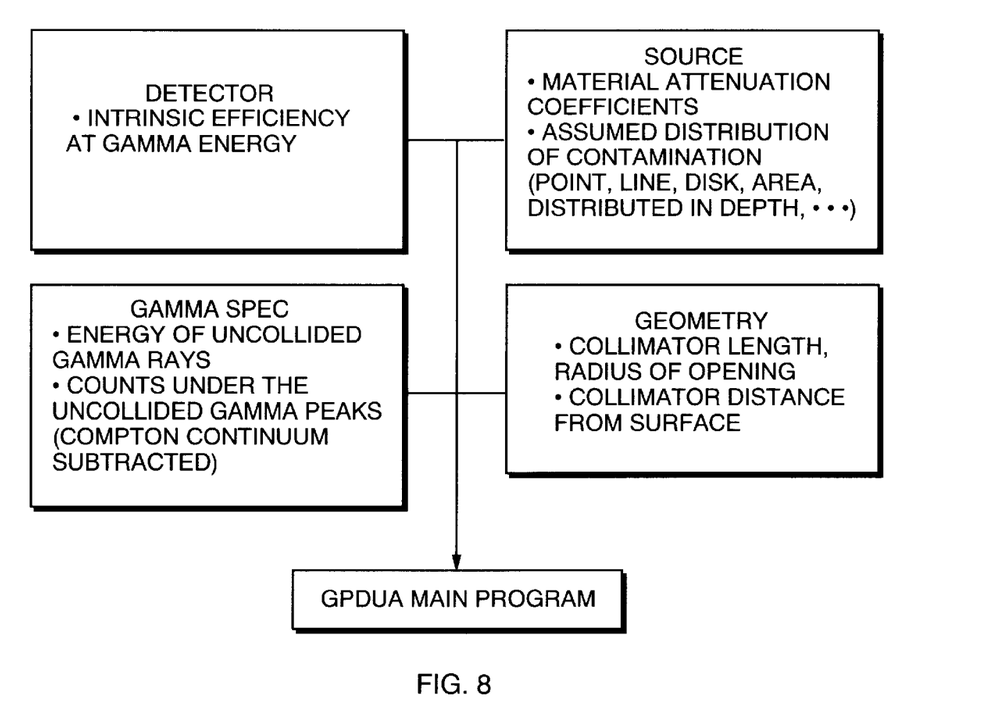
FIG. 8. is a flowchart for input requirements to the GPDUA.

The input requirements for the GPDUA are as shown in the flowchart of FIG. 8. The intrinsic efficiency of the detector must be determined in order to adjust the gamma spectroscopy uncollided gamma counts into uncollided surface counts along the detector surface. The GPDUA iterates on the depth prediction until this ratio of counts is within tolerance of the calculated ratio. Prior knowledge of the material attenuation coefficient is necessary. The code does have a menu for selected common materials and isotopes. Use of the menu will call a subprogram to calculate material attenuation coefficients given the gamma energy. It is important to note that prior knowledge of the distribution must also be supplied to the code. The distribution can be assumed or all the distributions can be calculated for prediction depths.

The gamma spectroscopy provides the uncollided peak information. The gamma energy and counts under the uncollided peaks are important inputs for the GPDUA. The uncollided peak information from the gamma spectroscopy output must have the Compton continuum subtracted to ensure the peak counts are due to the uncollided gamma energy and not downscattered energies from higher energy gamma rays. Additionally, the counts must be adjusted for background. In general, the code is very flexible in that any collimator geometry should work. User inputs include the collimator length, collimator radius, and the distance from the contaminated surface to the face of the collimator.

Figure 9:
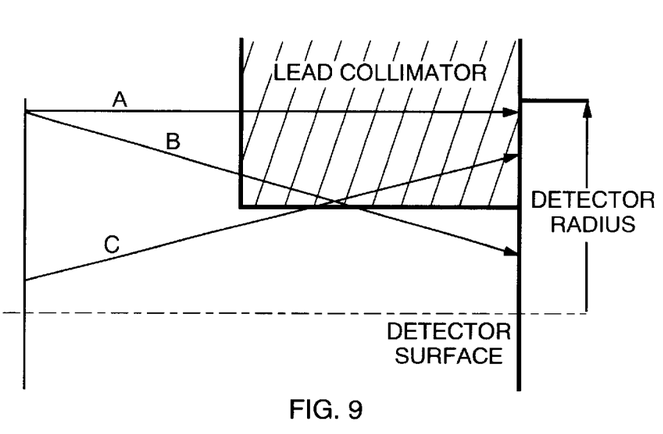
FIG. 9 is a schematic illustration showing how gamma ray paths less then ten mean free paths through the lead collimator will generally reach the detector as shown with gamma ray paths B and C.

From the results of MCNP simulations, the GPDUA models consistently predicts the depth of contamination to within 10% of the actual depth regardless of the type of contaminant distribution (point, disk, or linearly distributed). The narrow-beam approximation model produced poorer results; however, the model is based on ideal geometry and was not corrected for the gamma ray transport through portions of the lead collimators. A collimator thickness of 20.32 cm cannot be assumed to stop all gamma rays from entering the detector as suggested by the "good geometry" narrow-beam approximation model. As shown in FIG. 9, gamma rays enter the collimator through many directions since each source point can be considered an isotropic emitter. For the 1.33 MeV gamma ray from $^{60}$Co, the mean free path through lead is approximately 1.5 cm. With a collimator length of 20.32 cm, this is approximately 13.5 mean free paths. As shown in FIG. 9, any gamma rays traveling along path A can be assumed to be 100% attenuated since $N/N_o = e^{-13.5} \approx 1.4 \times 10^{-6}$.

Any gamma rays that travel through partial lengths of lead less then ten mean free paths such as paths B and C should be assumed to contribute to the detector counts and is referred to as the "lead effect." The shorter the path length through the lead, the more probable the gamma ray will pass through unattenuated.

Figure 10:
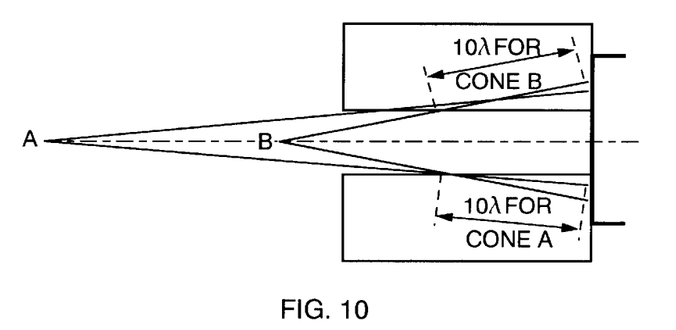
FIG. 10. illustrates how a cone A has a smaller solid angle through the lead collimator than cone B, cone limits being ten mean free paths ($10\lambda$) as will be explained.

As shown in Tables 2 and 3, the GPDUA predicted solutions are better for deeper depths. In fact, the narrow-beam approximation prediction approaches the same discrepancy as the GPDUA predictions for deep contamination depths. The reason for this can be seen in FIG. 10. FIG. 10 depicts two cones at certain depths from the detector face. Each cone is drawn so that the surface of the cone travels a maximum of ten mean free path lengths through the lead collimator. The deeper contamination (cone A) results in a smaller solid angle from the isotropic point source to the detector surface and consequently even fewer gamma rays emitted will travel through the lead. As the contamination gets deeper, the gamma rays that travel through the lead must propagate through the full length of lead, resulting in more attenuation. Under the deep contamination conditions, the narrow-beam approximation model and the point kernel model for a point source will be in closer agreement.

If there is sufficient room when measuring the gamma rays in-situ, the further the detector/collimator is from the contaminated surface, the more the narrow-beam approximation model approaches the results of the point kernel models. A consequence of getting too far away is that the solid angle of gamma ray emission gets smaller and smaller to the detector surface. This will require longer count times in order to obtain sufficient number of gamma rays in the spectroscopic output to ensure a standard error of less than 1%. Additionally, the further the detector/collimator is from the contaminated surface, the greater the area of the assay, which defeats the purpose of having a collimator to focus the assay in order to map the contaminated surface. The point kernel models place no restrictions on the distance from the contaminated wall as evidenced in Tables 2 and 3.

Prediction models for the depth of radiological contaminants are presented. The models for point, disk, and linearly distributed contaminate distributions have been verified through MCNP simulations. The PKMP model for the point source contaminant has been validated by experiments. The analytic models in the GPDUA rigorously calculate the number of gamma rays that impact on the detector surface through a unique and innovative method using point kernel techniques on a physical detector. The systematic error from the point kernel models is consistently less then 10%.

There are two primary restriction to using the method in this paper. First, there must be two or more gamma rays emitted from the same isotope, or that a single gamma-emitting isotope must contain progeny that are in secular equilibrium with the parent nuclide. Second, prior knowledge of the source distribution is required or must be assumed. Prior knowledge can be obtained by traditional core sampling. Once this information is obtained from the core sampling, the method proposed in this research could be used to conduct more rapid and larger area surveys if the sampling depth distribution is assumed the same throughout the material.

Derivation of the Point Kernel Model for Point Particle (PKMP)

Figure 11:
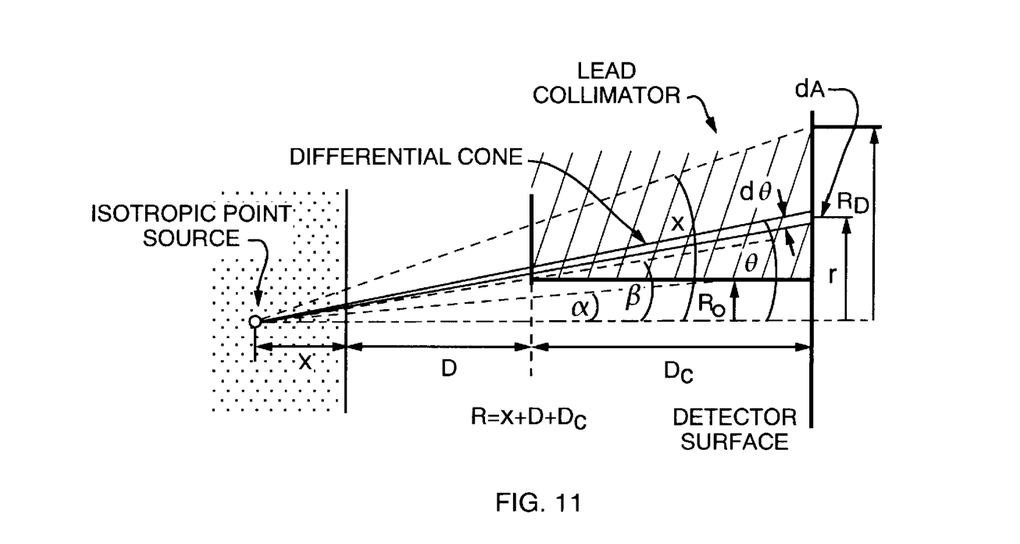
FIG. 11 is a cutaway illustration of the geometry for the point kernel method used in the present invention, the differential cone being integrated over the surface of a detector.

FIG. 11 depicts a cutaway view of the geometry showing the medium with a point source radioactive contaminant, the lead collimator, and the detector. In order to determine the response of a real detector with surface and volume from a point source the point kernel method is applied within the differential cone from the point source to the detector differential surface area dA, as shown in FIG. 6. The total number of gamma ray counts impacting on the surface of the detector is determined by integrating the differential cone around the detector's surface.

The net counts on the surface of the detector were presented in equation (5) and point kernel was introduced in equation (6). As shown in FIG. 6, the differential area along the detector surface can be described as $$dA[R(x),\theta,\omega] = r[R(x),\theta]dr[R(x),\theta]d\omega,$$

and since, $r = R(x)\tan\theta$ and $dr = R(x)\sec^2\theta d\theta$, $$dA[R(x),\theta,\omega] = R(x)^2 \tan\theta \sec^2\theta d\theta d\omega. \tag{11}$$

Substituting equations (11) and (6) into equation (5), the general solution becomes, $$N(E) = \frac{N'(E)}{\varepsilon(E)} = \tag{12}$$

$$A_o t Y(E) \int\limits_{\substack{\text{Detector}\\\text{Surface}}} \frac{\exp[-\mu(E)R(x)\sec\theta]}{4\pi[R(x)\sec\theta]^2} R(x)^2 \tan\theta \sec^2\theta d\theta d\omega,$$

$$N(E) = \frac{N'(E)}{\varepsilon(E)} = \frac{A_o t Y(E)}{4\pi} \int\limits_{\substack{\text{Detector}\\\text{Surface}}} \exp[-\mu(E)R(x)\sec\theta] \tan\theta d\theta d\omega,$$

$$N(E) = \frac{N'(E)}{\varepsilon(E)} = \frac{A_o t Y(E)}{2} \int_0^{\theta_{\max}(x)} \exp[-\mu(E)R(x)\sec\theta] \tan\theta d\theta.$$

The solution of equation (12) is separated into three integrals over the polar angle to accommodate the different response functions, $G(E,R(x),\theta)$, in the differential cones. As shown in FIG. 11, the first integral is over the polar angles zero to $\alpha(x)$ and the second integral over the polar angles $\lambda(x)$ to $\beta(x)$ and the third integral is over the polar angles $\beta(x)$ to $\omega(x)$. The first integral defines the transport of gamma rays through the medium and collimator opening without any transport through the lead collimator. The second integral defines the transport of gamma rays through the medium and partially through the lead collimator. The third integral defines the transport of gamma rays through the medium and the entire collimator.

The general solution can then be defined as, $$N(E) = \frac{A_0 t Y(E)}{2}(I_1 + I_2 + I_3) \tag{13}$$

where I is of the general form, $$I = 4\pi \int_{\theta_{min}(x)}^{\theta_{max}(x)} G(E, R(x), \theta) dA(R(x), \theta) d\theta. \tag{14}$$

The results are $$I_1 = \int_0^{\alpha(x)} \exp[-(\mu_m(E)x + \mu_{air}(E)(D + D_C))\sec\theta]\tan\theta d\theta, \tag{15}$$

$$I_2 = \int_{\alpha(x)}^{\beta(x)} \exp\{-[\mu_m(E)x\sec\theta + \mu_{air}(E)(R_C\csc\theta - x\sec\theta) + \mu_{Pb}(E)((x + D + D_C)\sec\theta - R_C\csc\theta)]\}\tan\theta d\theta, \tag{16}$$

$$I_3 = \int_{\beta(x)}^{\chi(x)} \exp\{-[\mu_m(E)x + \mu_{air}(E)D + \mu_{Pb}(E)D_C]\sec\theta\}\tan\theta d\theta \tag{17}$$

where $$\alpha(x) = \text{Tan}^{-1}\frac{R_C}{(x + D + D_C)} \tag{18}$$

$$\beta(x) = \text{Tan}^{-1}\frac{R_C}{x + D} \tag{19}$$

and, $$\chi(x) = \text{Tan}^{-1}\frac{R_D}{(x + D + D_C)}. \tag{20}$$

The Parameters;

$\mu_m(E), \mu_{air}(E)$, and $\mu_{Pb}(E)$ are the attenuation coefficients for the material, air, and lead respectively, for gamma energy E, $R_C$ and $R_D$ are the radius of the collimator and detector respectively, D is the distance from the contaminated surface to the collimator, and $D_C$ is the collimator length.

The model is obtained by taking the ratio of equation (13) for the high and low energy gamma rays, $E_{\gamma 1}$ and $E_{\gamma 2}$, emitted by the isotope. The final form of the model for equal counting times is $$\frac{N(E_{\gamma 1})}{N(E_{\gamma 2})} = \frac{Y(E_{\gamma 1})(I_1^1 + I_2^1 + I_3^1)}{Y(E_{\gamma 2})(I_1^2 + I_2^2 + I_3^2)} \tag{21}$$

where the superscript on the integrals $I_1$, $I_2$, and $I_3$ represent that integral being evaluated with the attenuation coefficients of the corresponding gamma ray energy.

A Gamma Penetration Depth Unfolding Algorithm (GPDUA) written in FORTRAN code solves equation (21) by iterating on the depth variable, x, until the right hand side is within in a specified tolerance of the left hand side. The ratio is obtained from the MCNP uncollided peak counts or the gamma spectroscopy uncollided peaks after adjusting these counts for the Compton continuum and the intrinsic efficiency.

While specific embodiments of the invention have been shown and described in detail to illustrate the application of the principles of the invention, it will be understood that the invention may be embodied otherwise without departing from such principles.

What is claimed is:

1. An apparatus for a non-destructive determination of an unknown depth of a radiological contamination having a depth distribution in a building medium, the building medium having a known attenuation coefficient, the radiological contamination being of a type which emits gamma radiation with at least two gamma rays of different energies per disintegration or a single gamma ray with at least one gamma-emitting progeny of different energies, but at an unknown rate, the apparatus comprising:

collimator means for collimating the gamma radiation emitted from the contamination and at the surface of the medium;

detector means having a gamma ray counting surface associated with the collimator means for simultaneously counting the collimated gamma radiation including the two gamma rays of different energies from the collimator means;

computing means operatively connected to the detector means for applying a gamma penetration depth unfolding algorithm to the two gamma rays simultaneously counted using a data differentiation technique with a point kernel implementation to iterate the depth of the contamination; and a computer connected to the detector means and containing the computing means as a computer program.

2. An apparatus according to claim 1, wherein the computer is a portable computer, the apparatus being portable.

3. An apparatus according to claim 1, wherein the collimator means comprises a lead collimator having bore with an aperture for facing a surface of the building medium for receiving gamma radiation from the contamination, the detector means being at an end of the bore opposite from the aperture.

4. An apparatus according to claim 1, wherein the depth unfolding algorithm is:

$$x = \frac{\ln\left(\frac{N_1 t_2 Y_2 \varepsilon_2}{N_2 t_1 Y_1 \varepsilon_1}\right)}{\mu_2 - \mu_1}$$

and where:

$Y_1$, and $Y_2$ are gamma yields;

$\varepsilon_1$ are $\varepsilon_2$ are intrinsic peak efficiencies of the detector for the two different gamma ray energies;

$\mu_1$ and $\mu_2$ are attenuation coefficients of the gamma ray energies in the contaminated building medium;

$N_1$ and $N_2$ are uncollided peak counts from a gamma spectroscopy after superimposed Compton scattering is subtracted;

$t_1$ and $t_2$ are counting times; and x is the unknown depth to be determined.

5. An method for non-destructively determining an unknown depth of a radiological contamination having a distribution in a building medium, the building medium having a known attenuation coefficient, the radiological contamination being of a type which emits gamma radiation with at least two gamma rays of different energies per disintegration or a single gamma ray with at least one gamma-emitting progeny of different energies, but at an unknown rate, the method comprising:

collimating gamma radiation emitted from the contamination and at the surface of the building medium;

counting the collimated gamma radiation including simultaneously counting the two gamma rays of different energies;

applying a gamma penetration depth unfolding algorithm to the two gamma rays of different energies simultaneously counted using a data differentiation technique with point kernel implementation to iterate the depth of the contamination; and using a computer connected to the detector means and containing a computer program for applying the gamma penetration depth unfolding algorithm.

6. An method according to claim 5, including transporting the computer to the medium.

7. An method according to claim 5, including using a lead collimator having a bore with an aperture for facing a surface of the building medium for receiving gamma radiation from the contamination, and counting the gamma radiation at an end of the bore opposite from the aperture.

8. A method according to claim 5, wherein the depth unfolding algorithm is:

$$x = \frac{\ln\left(\frac{N_1 t_2 Y_2 \varepsilon_2}{N_2 t_1 Y_1 \varepsilon_1}\right)}{\mu_2 - \mu_1}$$

and where:

$Y_1$, and $Y_2$ are gamma yields;

$\varepsilon_1$ are $\varepsilon_2$ are intrinsic peak efficiencies of the detector for the two different gamma ray energies;

$\mu_1$ and $\mu_2$ are attenuation coefficients of the gamma ray energies in the contaminated building medium;

$N_1$ and $N_2$ are uncollided peak counts from a gamma spectroscopy after superimposed Compton scattering is subtracted;

$t_1$ and $t_2$ are counting times; and $x$ is the unknown depth to be determined.

* * * * *